March 6, 1928.
J. COIBION
1,661,788
REVOLUBLE FORMING TOOL
Filed July 2, 1926
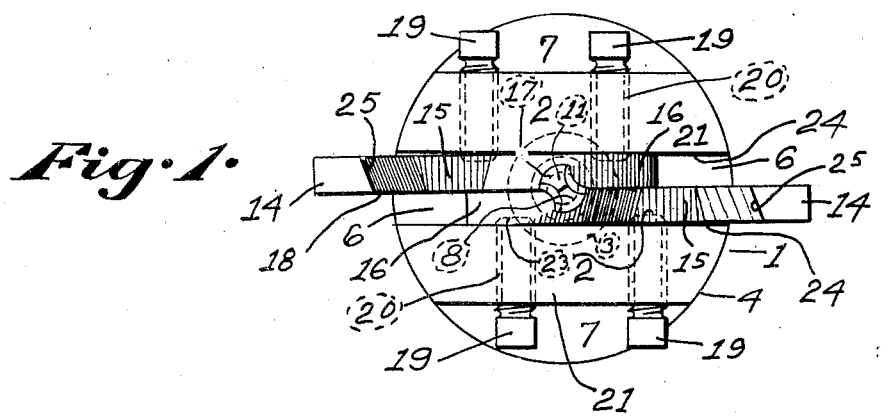
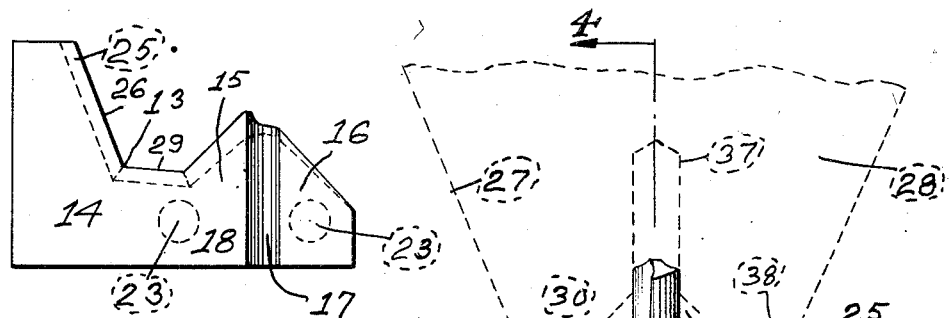
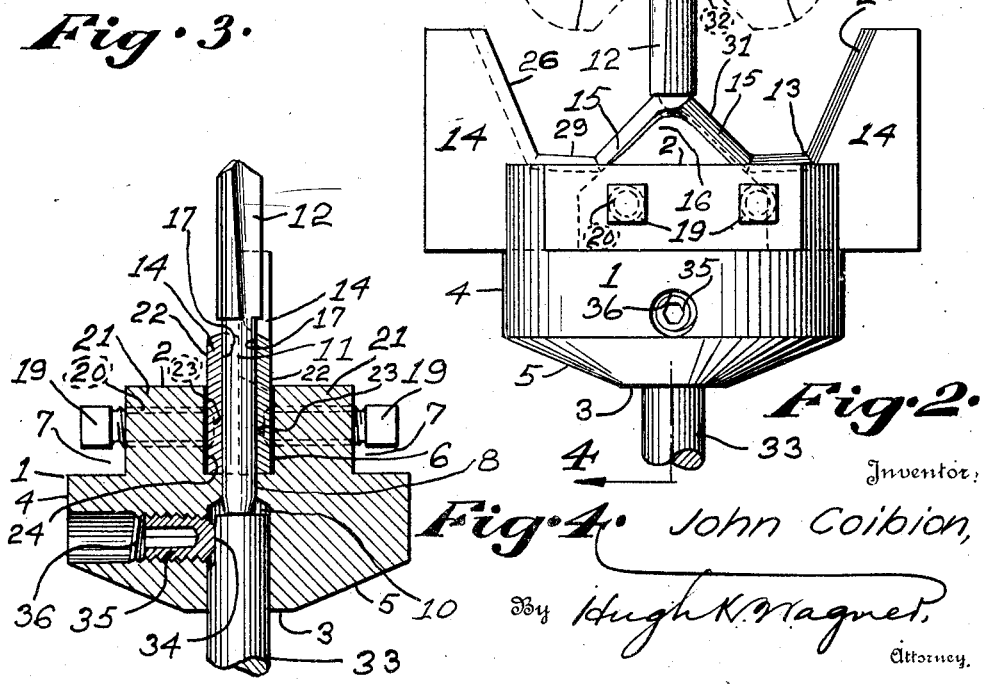
Inventor,
John Coibion,
By Hugh K. Wagner,
Attorney.

Patented Mar. 6, 1928.

1,661,788

UNITED STATES PATENT OFFICE.

JOHN COIBION, OF RICHMOND HEIGHTS, MISSOURI.

REVOLUBLE FORMING TOOL.

Application filed July 2, 1926. Serial No. 120,043.

This invention relates generally to tools for forming bodies of revolution by reason of the rotation of the tool relatively to the body, and has more particular reference to a tool adapted for trimming the base and lower portion of the lateral surface of bowling pins and the like, although certain salient features of the invention are applicable to turning, facing, grinding, and forming tools generally.

The lower peripheral edges of bowling pins become battered and worn during use to a degree which renders them unfit for further use. Badly worn pins are unstable and can not be made to stand up properly. Hitherto, such worn pins have had their bases refaced by sandpapering, but repeated sandpapering, on account of the tapering sides of the pin, eventually results in increasing the diameter of the base beyond the limit permitted by standard practice. It is, therefore, necessary to also trim the sides after this limit has been reached in order to keep the base diameter within the allowable limit. Hitherto, such a trimming of the sides and base has been performed by the ordinary process of turning and facing in a lathe. Such a process necessarily requires a preliminary setting up and chucking of the pin, besides well-known adjustments of the tool and manipulations of the lathe, all of which consumes considerable time, besides taking too large a cut. The base of a bowling pin is also normally slightly convex, and the ordinary operation of sandpapering the pin by hand tends to make the bottom face straight instead of preserving the original convex form.

Accordingly, an object of the present invention is to provide a tool which will expedite the process of trimming these pins.

Another object is to provide a tool which will accurately preserve the original configuration of the lower portion of the pin in every detail when trimming the same.

A further object is to provide a tool for the purpose which may be readily attached to any rotating arbor or shaft, and need not be set up in a special machine for the purpose.

Another object is to provide such a tool having means for automatically centering the pin or work relatively to the tool.

Another object is to provide simple means for removably securing the cutters and centering means to the revoluble head of the tool.

Other objects and advantages, more or less ancillary to the foregoing, will appear in the course of the following description of a preferred embodiment of this invention.

In the accompanying drawings forming part of this specification, in which like numbers of reference denote like parts wherever they occur, Figure 1 is a view of the operating end of the tool;

Figure 2 is an elevation;

Figure 3 is a view of one of the cutters as it appears detached from the cutter head; and Figure 4 is a longitudinal central sectional view taken on the line 4—4 in Figure 2, certain parts being in elevation.

The illustrated structure includes a revoluble cutter head 1, preferably having a front end face 2, rear end face 3, and lateral cylindrical surface 4. The rear face 3 and lateral face 4 are preferably connected by a convex conical surface 5. A diametrical transverse rectangular-shaped slot 6 is formed in the front face 2, and recesses 7 parallel and opposite thereto are formed in opposite sides at the juncture of the front surface 2 and lateral face 4. A drill socket 8, smaller transversely than the slot 6, extends centrally into the retracted face 9 of the slot 6, enlarging at its lower end into a concentric arbor socket 10, which opens centrally into the rear face 3.

The shank 11 of a centering drill 12 fits into the socket 8. The shank 11 preferably projects beyond the front face 2. Shaping means having forming edges 13 which conform to the desired outline of a longitudinal central section of the bowling pin or body of revolution, in the present instance only to the lower portion of the outline, since it is not necessary to trim the entire lateral surface, are seated in the slot 6. The shaping means are preferably in the form of plates 14, so that they project as flanges from the face 2. Each of the plates 14 is slightly thinner than half the width of the slot 6, and has a cutting portion 15 which extends radially outward from the drill 12 in a direction opposite to that of its fellow plate 14, the remaining inner portion 16 of each plate extending on the opposite side of the drill 12 in the opposite direction to overlap the cutting portion of its fellow, so that the drill 12 is intermediate of the overlapping plates 14. The plates 14 are recessed at 17 on their meeting faces 18 to fit the stem 11, so that the latter is intimately embraced by the said plates 14 and clamped therebetween when the plates are clamped together by set screws 19, threading into tapped holes 20 in the flanges 21, formed between the slot 6 and recesses 7. The plates 14 may be recessed on their outer sides 22 to form seats 23 for the inner ends of the set screws 19. The plates 14, if desired, may be slightly separated by interposing thin shims between them. The screws 19 exert pressure to force the outer face 22 of each plate 14 against its respective seat or adjacent lateral face 24 of the slot 6. The cutting edge of the cutters or plates 14 are formed on their inner meeting faces 18 by beveling the plates 14 as at 25, the edge portion 26 turning the lateral face 27 of the pin 28 that is being resurfaced, the edge portion 29 facing the normally slightly convex base 30 of the pin, and the edge portion 31 facing the cavity 32 in the base 30.

In order to attain some of the objects of the invention, it is merely necessary that there be relative movement between the tool and the work 28, and either one may rotate while the other is stationary. However, if the tool be rotated, it is not necessary to adjust and clutch anew each pin that is to be operated upon, so that the tool operates more efficiently if rotated than if the work rotates. The head 1 may be connected to any suitable rotating shaft or arbor, and may be operated horizontally, vertically, or in any other suitable position. It is, however, preferable to affix the head to the upper end of a vertical rotating shaft 33, which may be flattened at 34 to provide a seat for a set screw 35, screwing into a tapped hole 36, connecting the surface 4 and the socket 10. It is then merely necessary to hold the work 28 steadily by any suitable means (not shown), and present the lower end thereof to the tool, the drill 12 entering the central hole 37 in the bottom of the pin 28 and centering the pin with relation to the tool. If there is no hole 37, the drill will form one. As the work descends, the side 27, bottom 30, and cavity 32 are trimmed by the cutters 14, the rounded or battered lower peripheral edge 38 of the pin being resharpened.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. A tool for shaping a body to a round cross-section, comprising a head revoluble relatively to the body and having an end face provided with a seat thereon and an axial stem for centering the said body with respect to the said head, and a shaping element engaging the said seat and recessed to engage the said stem for preventing dislocation of the shaping element parallel to the said seat.

2. A tool of the character described comprising a relatively revoluble head presenting a transverse seat and an axial drill socket at one end, a drill in the said socket, and a pair of overlapping shaping elements constrained against the said seat and co-operating with the said drill for preventing dislocation of the said elements parallel to the said seat.

3. A tool of the character described comprising a relatively revoluble head presenting a transverse seat and a longitudinally extending drill socket, a drill in the said socket, and a shaping element constrained against the said seat and having a recess for receiving the said drill.

4. A tool for shaping a body to a round cross-section, comprising a head revoluble with respect to the body, and a pair of overlapping shaping elements borne thereby on respective opposite sides of the axis and each bearing a forming edge conforming to the desired outline of a longitudinal section of the body.

5. A tool for shaping a body to a round cross-section, comprising a head revoluble with respect to the body and bearing a central longitudinally projecting stem, and a pair of shaping plates borne transversely by the said head on respective opposite sides of the stem and having their inner end portions overlapping and recessed to embrace the said stem.

6. A tool of the character described comprising a relatively revoluble head presenting an axial drill socket, a drill in the socket, a pair of shaping plates seated on the head on respective opposite sides of the drill and having their inner end portions overlapping to receive the drill intermediately thereof, and means for clamping the said plates against the said drill.

7. A tool of the character described comprising a head having a transverse diametrical slot at its operating end and a central stem thinner than the width of the slot and projecting outwardly from the bottom thereof, a pair of shaping plates disposed in the slot and each adapted to seat on respective opposite sides thereof and extending outwardly in opposite respective directions from the said stem but having their inner end portions overlapping and recessed to receive the stem intermediately thereof, and means for clamping the said plates against their respective seats.

8. A tool of the character described comprising a head having a drill socket extending into one end thereof and a transverse slot in the end face meeting the said socket, a drill projecting from the socket, a pair of shaping plates disposed in the slot and each adapted to seat on respective opposite sides thereof and extending radially in opposite directions from the stem but having their inner end portions overlapping and engaging the said drill intermediately thereof, and means for clamping the said plates against the said drill and against their respective seats.

9. A tool of the class described comprising a head presenting an axial socket and a transverse slot in the end face, an axial stem mounted in said socket, a pair of shaping plates seated in said slot and having their inner overlapping end portions recessed to receive said axial stem and means for separably removably connecting said plates to said head.

In testimony whereof I hereunto affix my signature.

JOHN COIBION.